United States Patent Office 3,266,874
Patented August 16, 1966

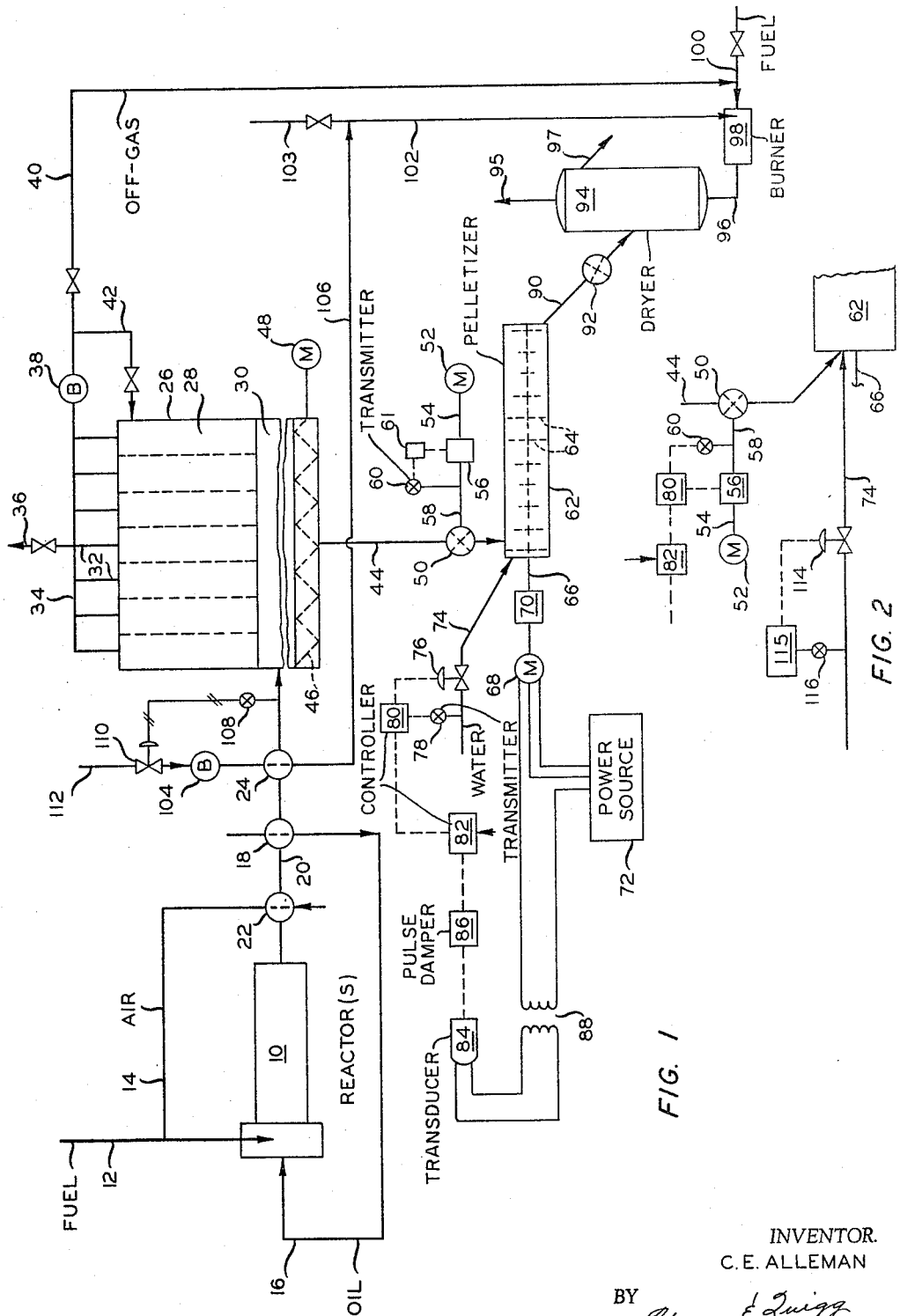

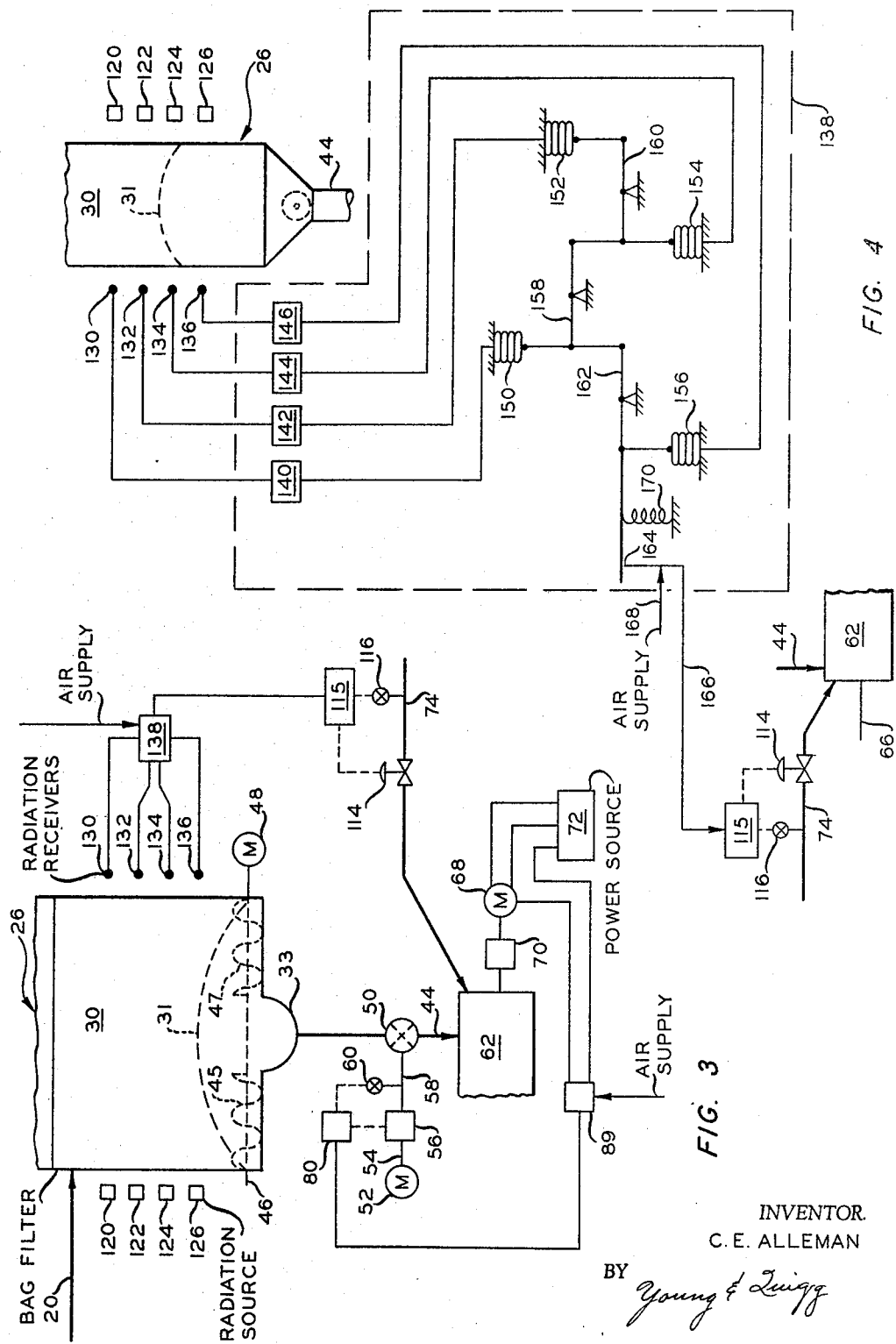

3,266,874
AGGLOMERATING CARBON BLACK BY MAINTAINING CONSTANT PELLETIZER MOTOR POWER REQUIREMENT
Carl E. Alleman, Bartlesville, Okla., assignor to Phillips Petroleum Company, a corporation of Delaware
Filed Apr. 2, 1963, Ser. No. 270,060
4 Claims. (Cl. 23—314)

This invention relates to a process and apparatus for the production, recovery, and pelleting of carbon black.

This application is a continuation-in-part of my copending application Ser. No. 128,445, filed August 1, 1961, now abandoned.

Carbon black is conventionally made by subjecting a suitable hydrocarbon fuel, usually an oil, to partial combustion in a special type furnace which is designed to efficiently convert the fuel to carbon black of desired properties. In conventional carbon black plants, the smoke from the carbon black furnace or reactor is quenched in the downstream end of the reactor by means of a spray of water whereby the hot gases are suddenly cooled to a temperature below reaction temperature. The hot smoke is then passed thru an oil and an air preheater in indirect heat exchange therewith to preheat the air and oil feeds to the reactor. Subsequently, the partially cooled smoke is passed thru a quench tower where it is subjected to sec-quench to reduce the temperature to about 450° F. or less, before passing the hot smoke thru a bag filter unit to recover carbon black therefrom and vent the off-gas from the process. An agglomerator is usually positioned between the secondary quench tower and the bag filter.

In conventional recovery equipment, the carbon black recovered in the bottom of the filter unit is fed by feed screws to a pulverizer which in turn passes the black to a delivery line which connects with a pneumatic conveyor line for transferring the carbon black to a cyclone separator which recovers and delivers the loose black thru a star valve to a subjacent surge bin. The black is then fed thru another star valve to a wet pelletizer. The black and water containing from about 1 to 2 weight percent of molasses are fed at regulated rates to the pelletizer which is in the form of a pug mill containing rods radially set and spirally arranged on an axial shaft for forming pellets and moving the pellets thrut the pelletizer. The pellets are delivered from the pelletizer to a similar device which polishes and finishes the pellets prior to delivering them to a suitable dryer for decreasing their moisture content to less than about 1 percent by weight. The pellets are then suitable for storage and/or shipping.

Heretofore the difficulty in feeding loose black and controlling the pelleting operation has made it necessary to convey the black from the filter thrut a pneumatic conveyor system into the top of a surge bin of considerable capacity. The control of the pelleting process as set forth in the above-identified application has so greatly improved the control of the pelleting process that I have found it feasible to greatly simplify the carbon black recovery and pelleting process in general plant use in the industry. In conventional plant equipment, a pulverizer is positioned in the delivery line leading from the bag filter unit to the pneumatic conveyor system. With the simplified and improved control of pelleting, it is unnecessary to utilize a separate surge bin for storing carbon black heretofore required because of the variation in pelleting rate prevalent in conventional carbon black plants. Adequate surge volume is provided in the bottom of the bag filter unit. In the improved arrangement of the invention, the carbon black is passed directly thru the delivery line leading from the bag filter unit into the pelletizer, using a star valve or other pressure sealing feeder for passing the black thru the delivery line. This eliminates the pulverizer, the pneumatic conveyor, including the blower supplying the transport gas, the cyclone separator with its star valve, and the surge bin just upstream of the pelletizer. It is found that the polisher can be eliminated because of the excellent control provided in the pelleting operation by automatically regulating the feed to the pelletizer in response to the power consumed in the pelleting operation. It is also found that the secondary quench (using water) can be eliminated by preheating the air used in the dryer in indirect heat exchange with the smoke passing to the bag filter unit. By using stainless steel equipment the pulverizer may be eliminated. The agglomerator has been found unnecessary when operating the filter according to advanced techniques which are now used in the industry.

Accordingly, it is an object of the invention to provide an improved and simplified apparatus and process for recovering and pelleting carbon black from a smoke stream egressing from a carbon black reactor. Another object is to reduce the cost of plant equipment in a carbon black plant. A further object is to provide a more economical process for recovering and pelleting carbon black. Other objects of the invention will become apparent to one skilled in the art upon consideration of the accompanying disclosure.

A more complete understanding of the invention may be obtained by reference to the accompanying schematic drawing of which FIGURE 1 is a view of arrangement of apparatus illustrating the invention; FIGURE 2 is a view of another embodiment of a portion of FIGURE 1; FIGURE 3 is a view of another arrangement of apparatus illustrating the invention; and FIGURE 4 is a view showing in more detail a portion of the controls of FIGURE 3.

In FIGURE 1, a tangential reactor(s) 10 is provided with a fuel line 12 and an air line 14 connected tangentially with the feed end of the reactor. An axial oil line 16 feeds oil axially into the reactor after passing thru indirect heat exchanger 18 in smoke line 20. A second indirect heat exchanger 22 in smoke line 20 preheats the air passing thru line 14. Smoke in line 20 passes thru a third heat exchanger 24 before passing into bag filter unit 26.

Bag filter unit 26 is a conventional unit comprising a series of filtering compartments 28 containing inverted filter bags opening into collection compartment 30 which also serves as a plenum chamber for smoke distribution. The smoke passes upwardly into the open mouthed bags which trap the black and allow gas to pass thru them into the sealed compartments surrounding the bags from which it then escapes thru effluent lines 32 into manifold 34. The off-gas is then vented thru line 36 or passed by means of blower 38 thru line 40 to use described hereinafter.

The filter bags are repressured from the outside by off-gas introduced to the filer unit thru line 42, compartment by compartment, in sequence, so as to free the carbon black clinging to the inside walls of the bags and drop the same into compartment 30. The filter bags employ rings to prevent their collapse during repressuring and horns are utilized to vibrate the bags during the repressuring phase of the process to help free the bags of black. These details of the bag filter unit are conventional and are not shown herein.

Compartment 30 is constructed with adequate height to provide a sizable surge volume for black. A suitable surge level indicator such as that shown in FIGURE 3 is provided so that the rate of feeding black to the pelletizer may be varied to maintain the surge level within desired limits.

The recovered carbon black is moved thru the bottom of compartment 30 to delivery line 44 by means of left and right hand conveyor screws 46 operated by motor 48. The loose black is fed at a selected rate (in accordance with the rate of producing black) thru delivery line 44 by means of feeder 50 which is a star valve or other suitable variable rate feeder. Feeder 50 is operated by an electric motor 52 on shaft 54, a variable speed transmission 56, and shaft 58. In the embodiment shown, a speed transmitter 60 senses the speed of shaft 58 and feeds a signal to speed controller 80 to maintain the speed of shaft 58 relatively constant thru control of transmission 56. This maintains the feed rate of black thru line 44 relatively constant but allows resetting of controler 61 as the level of black in 30 changes substantially. This controls the feed of black to wet pellet mill 62.

Pelletizer 62 is provided with radial pins 64 operating on shaft 66. Shaft 66 is operated by electric motor 68 thru a suitable gear box 70. Motor 68 is supplied by a suitable power source 72. Water is fed to the pelletizer thru a supply line 74.

The control system for maintaining constant pelleting operation comprises a motor valve 76 in water line 74, an indicating flow transmitter 78 sensitive to the flow of water thru line 74, a receiver-controller 80 (also designated in the art as a flow-receiver-controller) which controls the amount of opening of valve 76. Instrument 80 is controlled by a second receiver-controller 82 with which it is operatively connected. Controller 82 receives a pneumatic signal from electro-pneumatic transducer 84 which passes thru pulse damper 86. One coil of transformer 88 is in circuit with and sensitive to the power or current being consumed by motor 68 and the other coil of transformer 88 is in circuit with transducer 84 so that, as the power or current required to rotate shaft 66 varies, the current flowing thru transducer 84 also varies and the pneumatic signal emitted by instrument 84 is varied proportionally. In this manner, variations in current or power requirements are transmitted thru the control system so as to vary the opening of valve 76 and, therefore, the flow rate of water into pelletizer 62.

Carbon black-water mixtures behave peculiarly to this system, there being no ordinary viscosity relation. The amount of water added to the black to obtain suitable pelleting is in the range of 42 to 58 weight percent of the mixture and, generally, the mixture is about 50 percent water and 50 percent black. Increasing the water content of the mixture being pelleted within this range always increases the power requirement of the pelletizer which is contrary to the expected result. Conversely, decreasing the water rate or water content of the mix decreases the power requirement. The arrangement shown decreases the water flow rate into the pelletizer when the power required for operation of the pelletizer increases above a predetermined rate in amperes (with voltage constant) suitable for proper pelleting and increases the water flow rate when the power requirement falls below the predetermined value. In the arrangement shown, a relatively constant flow of black thru line 44 is maintained by controlling the speed of feeder 50 as shown in the drawing and described above.

Wet pellets pass thru line 90 and feeder 92 into dryer 94 where the water content of the pellets is reduced to less than about one weight percent. Dryer 94 is a fluidized bed dryer but other types of dryers may be utilized for drying the wet pellets. Fluidizing and drying gas admitted to the bottom of the dryer thru line 96 is prepared in burner 98 by burning a fuel, such as natural gas, supplied thru line 100, supplemented by off-gas from line 40 and admixed with air introduced to the burner thru line 102. All or most of the air for combustion of fuel in burner 98 is supplied by blower 104 in line 106 which passes thru indirect heat exchanger 24 in smoke line 20. The preheating of the air in heat exchanger 24 is particularly advantageous in that it reduces the smoke temperature to not more than 450° F. so as to prevent damage to the filter bags in bag filter unit 26 without adding volume to the cooled gas as is the case with water quenching practiced heretofore. And it also provides a high preheat for the air fed to burner 98 so that off-gas from line 40 can be burned more advantageously. This effects considerable economy in fuel since off-gas is usually vented to the atmosphere at 450° F.

Control of the temperature of the smoke entering bag filter unit 26 is effected by sensing the temperature in the smoke line and utilizing the sensed temperature by means of temperature controller 108 to control motor valve 110 in line 112 leading to blower 104. Instrument 108 opens valve 110 further when the temperature in smoke line 20 tends to rise above the set point of the instrument and closes this valve part way when the temperature of the smoke falls below the predetermined operating temperature (about 450° F.).

The arrangement of apparatus illustrated in FIGURE 2 maintains the water flow rate to the pelletizer 62 relatively constant and varies the flow rate of black thru line 44 in response to changes in power required to operate the pelletizer under good pellet-making conditions. Flow rate of water in line 74 is controlled by motor valve 114 which is in turn controlled by flow rate controller 115, sensitive to a rate of flow signal from transmitter 116 in the water line.

The speed of feeder 50 is varied by controlling the speed of variable speed transmission 56. Controller 80 receives a signal proportional to the speed of shaft 58 by means of speed transmitter 60 and also receives a signal from controller 82 which varies in accordance with the carbon black feed requirements to maintain a predetermined constant power input to motor 68 as sensed by the system illustrated in FIGURE 1. The set point of instrument 115 can be reset for different levels of carbon black in compartment 30.

It is also feasible to effect the drying of the wet pellets in a storage bin in lieu of dryer 94 by placing an elevator in line 90 and delivering the wet pellets to the top of the storage facility. In this arrangement, the upper section of the storage bin functions as a dryer, whereby the separate dryer is eliminated.

Referring to FIGURE 3, a control arrangement is shown similar to that of FIGURE 2 but which permits resetting of the water flow rate thru line 74, step-wise periodically, as the level of black 31 in compartment 30 rises and falls with production in the carbon black reactors. Left and righthand screws 45 and 47 on conveyor 46 auger the black into a sump 33 from which line 44, containing star valve 50, leads to pelletizer 62. Since the rate of production of black will vary within reasonable limits, the rate of feeding black to pelletizer 62 will desirably be varied periodically in order to compensate for these variations in rate of production of carbon black.

The controls shown in FIGURE 3 are substantially the same for the feeder 50 in line 44 as shown in FIGURE 2, box 89 containing transformer 88, electro-pneumatic transducer 84, pulse damper 86, and controller 82. This arrangement varies the rate of operation of star valve or feeder 50, with the water rate in line 74 substantially constant, so as to maintain the power input to motor 68 relatively constant. The operation of this system has previously been described. However, when the level of black in compartment 30 varies within certain limits, the additional controls shown effect a step-wise change in the water flow rate in line 74 so as to require the feeding of black at a slower or faster rate into the pelletizer in order to maintain the set power requirement for forming good pellets.

The system of controls devised for resetting motor valve 114 in line 74 comprises a series of radiation sources 120, 122, 124 and 126 and corresponding radiation receivers 130, 132, 134 and 136 at corresponding levels of compartment 30. These radiation receivers feed into box 138, the details of which are shown in FIGURE 4 and described below. As the level of black 31 varies from one level detector to the other, the control system resets valve 114 by means of a signal emitted by box 138 to controller 115. As the level of black rises in compartment 30 to the next higher detecting level, there is a need for feeding black thru feeder 50 at a faster rate in order to prevent undue build-up of black in compartment 30. Hence, in response to a rise in black level 31 to the next higher indicating level, instrument 138 emits a signal which causes controller 115 to increase the opening of motor valve 114 a predetermined amount and if the level 31 of black rises further to the next detection level, the control system makes another increased step-wise adjustment in the water flow rate in line 74. Conversely, as the level of black recedes from one detection level to another, the controls reset valve 114 at a lower flow rate in step-wise fashion from detection level to detection level.

The step-wise adjustment of water flow rate may be of the order of 10 to 40 gallons per hour when feeding approximately 3000 pounds per hour of black to the pelletizer. Usually, an adjustment of 25 gallons per hour when black level changes from one detection level to the other is sufficient to accommodate production rate changes.

In FIGURE 4 the radiation level detecting device is shown in relation to compartment 30 of bag filter 26 similarly to FIGURE 3. Box 138 includes electro-pneumatic transducers 140, 142, 144 and 146 which are connected with radiation receivers 130, 132, 134 and 136, respectively, to receive a decreased signal therefrom when the level of black 31 rises to the different detection levels at which the receivers are positioned. These radiation level detecting devices are conventional and need no further discussion. The electro-pneumatic transducers convert an electrical signal to a pneumatic signal which changes as the black level 31 passes the detecting level either when rising or falling within compartment 30.

Transducer 140 emits a pneumatic signal to bellows 150 which applies pressure on levers 158 and 162. Likewise, transducers 142, 144 and 146 emit pneumatic signals which apply pressure on bellows 152, 154 and 156, respectively. Pressure on bellows 152 exerts a force on lever 160 which in turn applies pressure to levers 158 and 162. Pressure on bellows 154 exerts a force on lever 158 which is transmitted to lever 162, and pressure exerted on bellows 156 exerts a force directly on lever 162 to move the free end thereof away from a bleed-off orifice 164 in instrument air line 166 which is connected with air supply line 168. Lever 162 is biased toward orifice 164 by spring 170. As the bellows system increases or decreases the pressure on lever 162, the rate of bleeding air is increased and decreased, respectively, so as to decrease and increase the pressure in line 166. This changes the air signal to controller 115 so as to change the setting of motor valve 114. Thus, as black level 31 rises from one indicator level to another, the air pressure in line 166 increases so as to increase the opening of valve 114 and demand more black. This actuates the control system on feeder 50 of FIGURE 3, causing increased flow of black. The reverse occurs when black level 31 drops from one indicator level to another.

When the carbon black level 31 is above the level of receiver 136 and below the level of receiver 134, bellows 150, 152 and 154 are exerting a force on the respective levers and on level 163 which is forcing the free end thereof farther away from orifice opening 164 in line 166 against the tension of spring 170 which provides a pneumatic signal of the required strength to maintain the desired setting of valve 114. As the carbon black level 31 rises above the level of receiver 134, the signal emitted by electro-pneumatic transducer 144 is greatly reduced so as to decrease the force applied by bellows 154 directly on lever 162 and the space between orifice 164 and the free end of the lever is reduced so as to increase the pressure in air line 166. This increases the opening of motor valve 114 thru the air signal on controller 115. Thus, as the level of black in compartment 30 rises due to increased production, the opening of motor valve 114 is increased, step-wise, so as to increase the flow rate of water and directly increase the flow rate of carbon black to compensate therefor as illustrated in connection with FIGURE 3.

Conversely, as the black level 31 recedes in compartment 30 below any of the indicating levels, the signal from the corresponding transducer is increased and pressure is again applied to lever 162 to increase the space between opening 164 and the free end of the lever thereby reducing the air pressure or force of the signal in line 166 and causing a step-wise reduction in the opening of valve 114.

In accordance with another embodiment of the invention, it is feasible to set the speed of feeder 50 (FIGURE 1) high enough to feed the black to pelletizer 62 as fast as screw 46 brings the black to it. This means that the black flow rate to the pelletizer is regulated only by the rate of production in the reactor(s). Variations in the rate of black thus fed to the pelletizer 62 are easily handled by the control system on the water rate in line 74 as described with reference to FIGURE 1. Thus, feeder 50, in this embodiment of the invention, performs only the function of a gas lock to maintain pressure in filter 26 while passing black therefrom. In this operation it is important to schedule the dumping of the various filter compartments sequentially so that stacking of one dump on another is avoided. In other words, the black from only one compartment at a time is fed to the pelletizer.

As a corollary, the hopper 30 will be essentially empty. This should be encouraged by installing vibrators on the sides of the hopper to prevent black collections thereon. Collection of black on the sides of the hopper encourages corrosion there and it tends to build up and slough off in "slugs." These slugs tend to upset the pelleting control and also interfere with quality control since some of this "stored" black gets into the product samples hours or even days after being produced and the samples are thus not representative of current products from the reactors.

In the foregoing disclosure and the appended claims the expression "substantially constant" with reference to the feed rate of the carbon black is to be interpreted as allowing for some fluctuation in this feed rate. It is vertually impossible to maintain the flow rate of black constant, but it can be maintained reasonably constant. The production rate of black in the reactors varies somewhat but this rate and the normal rate of recovery in the bag filter are to be regarded as within the scope of the term "substantially constant." In reality this term means not intentionally varied and includes rates which normally fluctuate within reasonable limits.

To illustrate, the production rate of carbon black in the reactors may vary ±500 pounds per hour from a normal rate of 3000 pounds per hour over a period of several hours. This is to be regarded as a "substantially constant" rate and the control on the flow rate of water to maintain the power input to the pelletizer (amps) as described herein compensates for these normal fluctuations in the black rate, even when feeding the black directly to the pellet mill from the filter as fast as it is recovered.

Thus it can be seen that the arrangement of apparatus and the process of the invention shown and described herein greatly simplify a carbon black plant by eliminating a substantial amount of expensive equipment and reducing the handling and transport of carbon black to a minimum.

Certain modifications of the invention will become apparent to those skilled in the art and the illustrative details disclosed are not to be construed as imposing unnecessary limitations on the invention.

I claim:

1. A plant for producing pelleted carbon black comprising in combination (1) reactor means for producing a stream of smoke containing carbon black;
(2) an effluent line from said reactor passing thru indirect heat exchange means directly to a bag filter having a lower compartment for smoke distribution and carbon black reception, an upper compartment for filter bags opening into said lower compartment, effluent conduit means from said upper compartment for off-gas, a carbon black delivery line connected with the bottom of said lower compartment, and conveyor means in the bottom of said lower compartment for moving black to said delivery line;
(3) a pug mill type pelletizer in said delivery line having an inlet water line, an effluent pellet line, an axial shaft with radial pins thereon for agitating black therein and an electric motor rotatably connected with said shaft;
(4) flow control means in said delivery line for controlling the flow of black directly from said lower compartment to said pelletizer;
(5) valve means in said water line for controlling the flow of water to said pelletizer;
(6) an electric power source in circuit with said motor;
(7) first means connected with said circuit for sensing the power required to operate said motor and translating same into a pneumatic signal proportional thereto;
(8) second means for sensing one of the flow rate of said water thru said valve and said black thru said flow control means while maintaining the other flow rate relatively constant, and emitting a pneumatic signal proportional thereto;
(9) third means for maintaining the other of said flow rate of said water and said black relatively constant;
(10) fourth means for receiving the signals from said first means and said second means and controlling flow thru said one of said valve means in said water line and said flow control means in said delivery line in response thereto for increasing water concentration in the pelleter of (1) when the current falls below a normal value and decreasing said water concentration when the current exceeds said value so as to maintain the power requirement of said motor relatively constant;
(11) a dryer connected directly with said effluent pellet line, said dryer including burner means for supplying hot drying gas, and
(12) conduit means for passing air thru the indirect heat exchange means of (2) to heat said air and to pass same to the burner means of (11).

2. The plant of claim 1 including
(13) conduit means connecting the effluent conduit means of (2) with the burner means of (11) for supplying off-gas as fuel and drying gas.

3. A process for producing pelleted carbon black which comprises the steps of
(1) pyrolytically converting a hydrocarbon feed by partial oxidation with air to form a smoke stream containing carbon black;
(2) reducing the temperature of said smoke stream to the range of about 300° to 450° F. by indirect heat exchange with at least one of air and hydrocarbon feed;
(3) passing the cooled smoke stream directly from step (2) into a bag filter so as to recover carbon black therefrom and vent off-gas;
(4) feeding recovered carbon black of step (3) directly to a wet pelletizer;
(5) feeding water to said pelletizer to form pellets containing from 42 to 58 weight percent water;
(6) maintaining the rate of feed of one of steps (4) and (5) relatively constant;
(7) sensing the power required to operate said pelletizer;
(8) regulating the rate of feed of the other of steps (4) and (5) to increase water concentration in the pelletizer of step (4) when the sensed power falls below a normal value and decreasing water concentration when sensed power exceeds said value so as to maintain said power relatively constant and produce substantially uniform wet pellets;
(9) drying the resulting pellets as the next step of the process, and
(10) heating air by indirect heat exchange with the smoke stream of step (1) to reduce said smoke to said temperature range;
(11) passing the heated air of step (10) to a burner in admixture with fuel so as to form hot drying gas;
(12) and maintaining the wet pellets of step (8) in suspension in said hot drying gas so as to effect drying step (9).

4. The process of claim 3 including the step of
(13) passing a portion of the off-gas of step (3) to the burner of step (11) as fuel to supply a substantial portion of the drying gas of step (11).

References Cited by the Examiner

UNITED STATES PATENTS

| 2,626,786 | 1/1953 | McGlothlin | 259—8 |
| 2,948,918 | 8/1960 | Austin | 23—314 |
| 3,024,093 | 3/1962 | Dye | 23—259.5 |

NORMAN YUDKOFF, *Primary Examiner.*

S. J. EMERY, A. J. ADAMCIK, *Assistant Examiners.*